April 4, 1961 G. E. DUCLO 2,977,840
RIGHT ANGLE AND RADIAL LINE PLOTTING INSTRUMENT
Filed Aug. 14, 1959 2 Sheets-Sheet 1
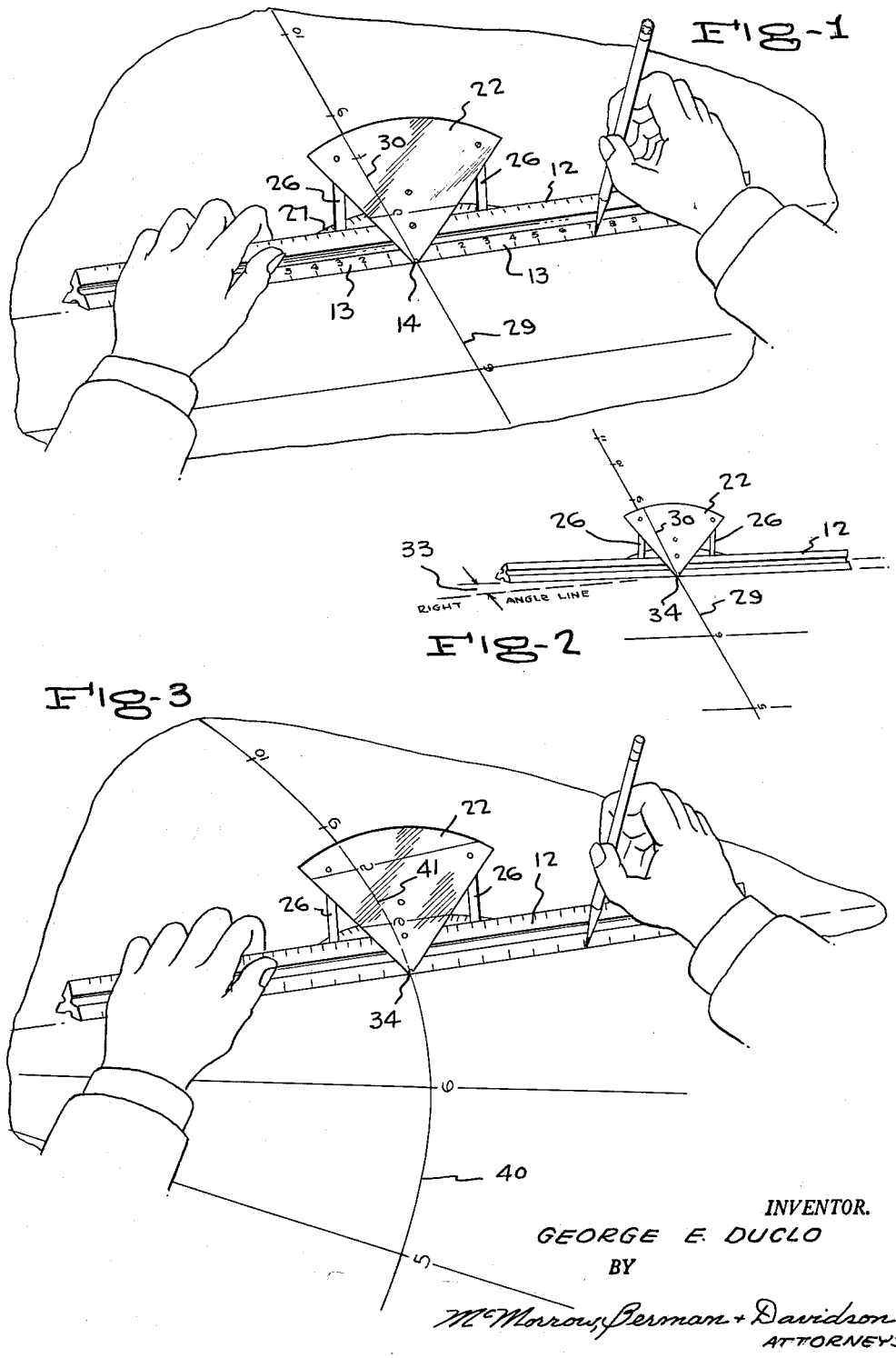
INVENTOR.
GEORGE E. DUCLO
BY
McMorrow, Berman + Davidson
ATTORNEYS April 4, 1961 G. E. DUCLO 2,977,840
RIGHT ANGLE AND RADIAL LINE PLOTTING INSTRUMENT
Filed Aug. 14, 1959 2 Sheets-Sheet 2

INVENTOR.
GEORGE E. DUCLO
BY
McMorrow, Berman & Davidson
ATTORNEYS

United States Patent Office 2,977,840
Patented Apr. 4, 1961

2,977,840

RIGHT ANGLE AND RADIAL LINE PLOTTING INSTRUMENT

George E. Duclo, 1883 Hope St., San Luis Obispo, Calif.

Filed Aug. 14, 1959, Ser. No. 833,721

7 Claims. (Cl. 88—2.2)

This invention relates to drawing instruments, and more particularly to an instrument for plotting desired points located on lines at right angles to a given line or on lines radial to a given circular curved line.

A main object of the invention is to provide a novel and improved drawing instrument for plotting points located on lines at right angles to a given line, the instrument being simple in construction, being easy to use, and providing a quick and accurate means for plotting points on lines at right angles to or radial to given lines, or lines skewed with respect to the perpendiculars to given lines.

A further object of the invention is to provide an improved drawing instrument which is relatively inexpensive to fabricate, which is compact in size, which is easy to use, and which provides a quick and accurate means for plotting points on lines at right angles or radial to given lines and for scaling distances on opposite sides of such given lines, for example, for use in topographical work such as for tabulating data from contour maps or aerial survey maps.

A still further object of the invention is to provide an improved drawing instrument for use in topographical work, for example, for plotting radial and right angle lines along a given line and for scaling distance to the right or left simultaneously from such a given line, the instrument having a high degree of accuracy, providing results comparable in accuracy to those plotted by the use of conventional compasses or triangles, and being of considerable value in plotting topographical data from field notes.

Further objects and advantages of the invention will become apparent from the following description and claims, and from the accompanying drawings, wherein:

Figure 1 is a perspective view showing an improved drawing instrument according to the present invention employed with a straight line to scale off points on lines perpendicular to said straight line.

Figure 2 is a perspective view, to a reduced scale, showing the condition which occurs when the main ruler element of the instrument is deviated from a position perpendicular to the given straight line of Figure 1.

Figure 3 is a perspective view, similar to Figure 1, showing the manner in which the instrument is employed to locate points on lines radial to a given circular curved line.

Figure 4:
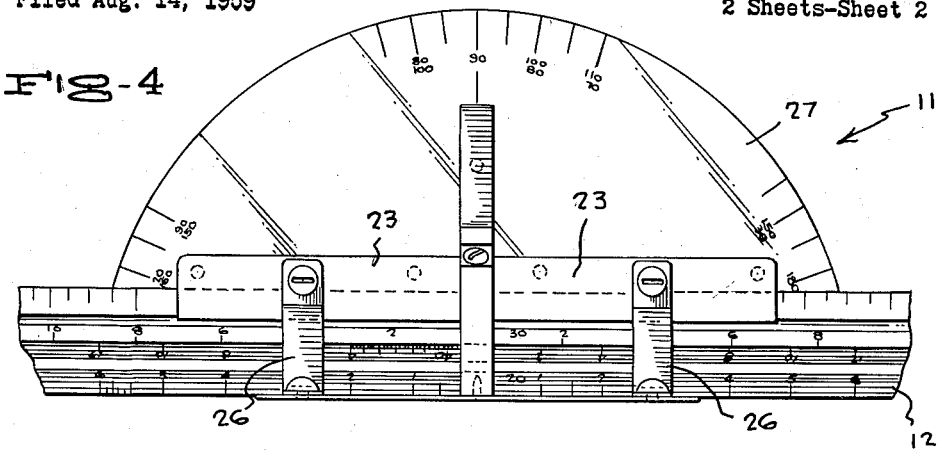
Figure 4 is an enlarged fragmentary top plan view of the instrument illustrated in Figures 1, 2 and 3.
Figure 5:
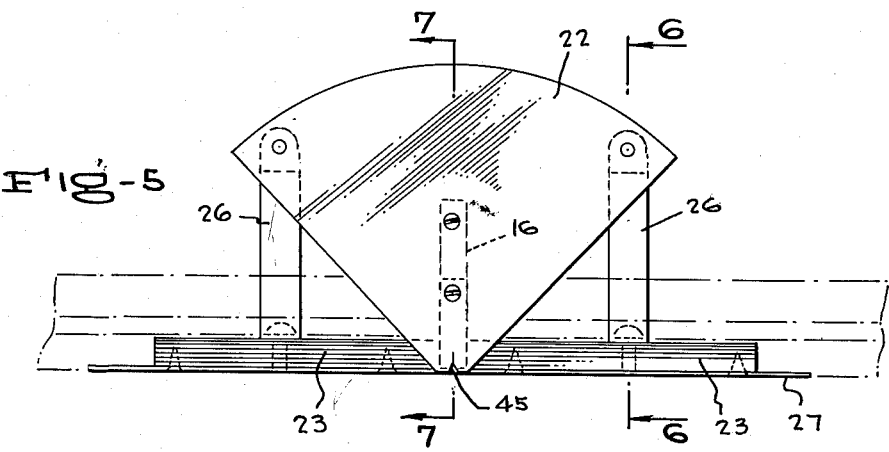
Figure 5 is a front elevational view of the instrument of Figure 4.
Figure 6:
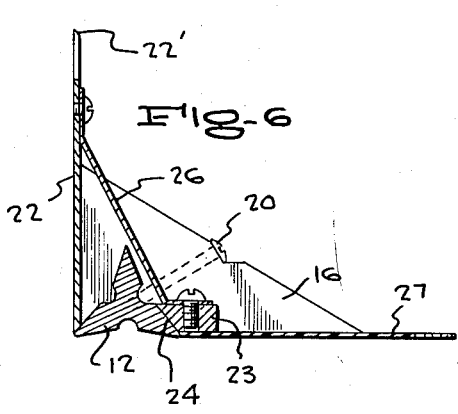
Figure 6 is a transverse vertical cross sectional view taken on the line 6—6 of Figure 5.

Referring to the drawings, and more particularly to Figures 4, 5 and 6, the improved drawing instrument is designated generally at 11 and comprises a straight-edged main ruler 12 which may be of any desired type, and which is illustrated by way of example, as being of substantially triangular cross section and being provided with respective scales on its surfaces, said scales extending along the edges of the ruler. The scales are arranged with their zero points located at the center of the ruler, being located in a transverse median plane of the ruler at the respective edges thereof. Thus, as illustrated in Figure 1, the forwardly and upwardly exposed surface of the ruler 12 is provided with the numbered scales 13, 13 increasing in numerical value on opposite sides of the zero point 14 of the ruler, the zero points being located at the edge of the ruler and in the transverse median plane thereof.

The various surfaces of the ruler are provided with scales of different significance, for example, with scales having the significance of those on a conventional engineer's scale.

Designated generally at 15 is a bracket structure which comprises a generally triangular main plate member 16 which is formed with an opening 17 slidably receiving the triangular ruler 12, whereby the triangular bracket plate 16 is disposed in a plane transverse to the ruler 12. The ruler 12 is formed at its transverse median plane with respective tapped openings 18 which intersect at the axis of the ruler and which are adapted to threadedly receive a locking screw 19 which is engaged through an inclined bore 20 formed in the plate member 16 so that the plate member may be secured to the ruler with a selected face of the ruler exposed upwardly and forwardly thereof.

Figure 7:
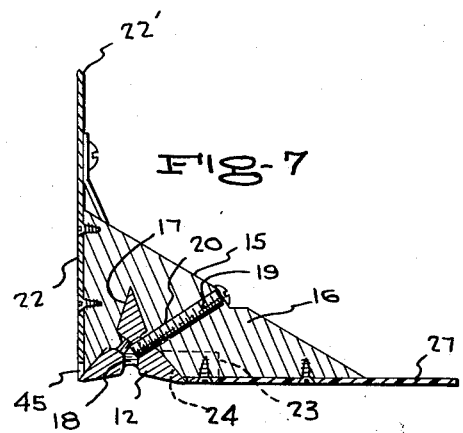
Figure 7 is a transverse vertical cross sectional view taken on the line 7—7 of Figure 5.

As shown in Figures 6 and 7, the plate member 16 is substantially right triangular in shape and has a bottom edge which is substantially horizontal, namely, which is substantially parallel to the horizontal plane defined by the front and rear bottom edges of the triangular ruler 12. Designated at 22 is a generally sector-shaped front surfaced mirror which is secured to the vertical front edge of the plate member 16 with its vertex located substantially at the bottom corner of the plate member 16, namely, with its vertex located substantially at the zero point of the scale associated with the forwardly and upwardly exposed face of ruler 12 when the ruler is locked to the plate member 16 by the fastening screw 19 in the manner illustrated in Figure 7.

Integrally formed with the plate member 16 are the respective guide bar elements 23, 23 which extend perpendicular to the plate member 16 in alignment with each other and which have beveled front surfaces 24 adapted to slidably engage with the inclined lower rear surface portions of the triangular ruler 12 in the manner illustrated in Figures 6 and 7. The respective opposite corner portions of the sector-shaped mirror 22 are rigidly connected to the guide bar members 23, 23 by inclined brace bars 26, 26 disposed symmetrically on opposite sides of the triangular bracket plate member 16.

Designated at 27 is a generally semi-circular transparent protractor which is secured to the bottom edge of the bracket plate 16 substantially flush with the plane defined by the bottom edges of the triangular ruler 17, as shown in Figure 7, the center point of the protractor member 27 substantially coinciding with the vertex of the sector-shaped mirror 22. Thus, the central point of the protractor 27 substantially coincides with the zero point of the selected scale upwardly and forwardly exposed on the ruler 12 at the front side thereof.

The sector-shaped mirror 22 is provided with the beveled top edge 22' to reduce the thickness of said top edge to a minimum at the uppermost portion of the mirror for a purpose presently to be explained.

In using the instrument, for example, to plot points located at given distances on lines perpendicular to a straight line 29, the ruler is placed so that it is substantially perpendicular to the line 29, and then the user employs the mirror 22 to align the reflection of the portion of line 29 in front of the mirror with the portion visible rearwardly thereof. With the user positioned substantially in alignment with the front and rear portions of the line 29, when the reflection 30 of the forward portion of the line 29 appears as a continuation of the rear portion of line 29, the ruler 12 will be perpendicular to line 29 within the limits of accuracy required. Since the mirror 22 is preferably of substantial radius, a relatively high degree of accuracy may be obtained. The user is thus enabled to place the ruler 12 perpendicular to the line 29 at various points along the line, whereby he is able to plot points at specified distances along perpendiculars to the line 29.

As shown in Figure 2, if the ruler deviates from a position perpendicular to the line 29, for example, by a skew angle 33, the reflection 30 will similarly appear to deviate from alignment with the rear portion of the line 29. When it is desired to plot points skewed in this manner, the protractor 27 may be employed as a means to skew the ruler by a desired angle from the line 29, whereby the desired points may be plotted by measuring off their distances from the zero point, shown at 34 in Figure 2, on either side of line 29 along the scale 13 appearing on the exposed face of the ruler 12.

The instrument 11 may also be employed to plot points located on lines radial with respect to a circular curved line 40, as shown in Figure 3, employing the same procedure described above. Thus, the instrument is placed with the zero point 34 of the ruler located at the specified point on line 40 at which the points are to be plotted on radial lines, the user being located substantially at a position tangential to the selected point on line 40 immediately in front of the instrument. The reflection 41 of the forward portion of line 40 may then be aligned visually with the rear portion of line 40, as illustrated in Figure 3, whereby the ruler 12 will be thus placed in a position substantially radial with respect to the circular curved line 40. The desired points along the lines radial to line 40 may then be plotted by measuring off the specified distances on either side of the zero point 34. As in the previously described use of the instrument, points on skewed lines may also be plotted by rotating the ruler by the specified skew angles with respect to the tangent to the circular curved line 40, as measured on the protractor 27.

The top edge of the mirror 22 is beveled downwardly and rearwardly, as shown in Figure 6, and as above mentioned, in order to minimize the thickness of said top edge, as viewed from the front of the instrument, whereby errors which would otherwise be caused by the thickness of the mirror, are reduced to a minimum.

To change the scale of the instrument, it is merely necessary to loosen the fastening screw 19, allowing the ruler to be slipped out and turned to the desired position thereof, after which the ruler may be again engaged in the bracket structure with the bracket structure secured to the center portion of the ruler, as illustrated in the drawings, by engaging the screw 19 in the tapped opening 18 at the rear portion of the ruler, as shown in Figure 7.

The vertex portion of the sector-shaped mirror 22 is preferably formed with a notch 45, allowing the zero point of the scale on the exposed face of the ruler 12 to be viewed from the front of the mirror.

While a specific embodiment of an improved instrument for plotting radial and right angle lines and scaling distances along said lines has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A drawing instrument comprising a straight-edged ruler provided with scale markings along an edge thereof and with a zero mark at the intermediate portion thereof, said scale markings increasing in numerical value on opposite sides of said zero mark, a sector-shaped mirror secured to said ruler and rising vertically from said edge in a plane containing said edge and with its vertex located substantially at said zero mark, and a substantially semicircular protractor secured to said ruler and contained in the bottom plane of the ruler, the center of said protractor substantially coinciding with the vertex of said mirror.

2. A drawing instrument comprising a straight-edged ruler of substantially triangular cross section, each surface of the ruler being provided with a scale extending along its edge and having a zero point substantially at the transverse median plane of the ruler, the scales having numerical markings increasing in value on opposite sides of the zero points thereof, bracket means slidably receiving said ruler, a sector-shaped mirror secured to said bracket means, said bracket means being constructed and arranged to support said mirror with its vertex located substantially at a bottom edge of said scale and in a position coplanar with and rising vertically from said bottom edge, and means detachably securing said ruler in said bracket means with the vertex of the mirror substantially coinciding with a zero point of the scale associated with said bottom edge.

3. A drawing instrument comprising a straight-edged ruler of substantially triangular cross section, each surface of the ruler being provided with a scale extending along its edge and having a zero point substantially at the transverse median plane of the ruler, the scales having numerical markings increasing in value on opposite sides of the zero points thereof, bracket means slidably receiving said ruler, a sector-shaped mirror secured to said bracket means, said bracket means being constructed and arranged to support said mirror with its vertex located substanitally at a bottom edge of said scale and in a position coplanar with and rising vertically from said bottom edge, means detachably securing said ruler in said bracket means with the vertex of the mirror substantially coinciding with a zero point of the scale associated with said bottom edge, and a substantially semicircular protractor secured to said ruler and contained in the bottom plane of the ruler, the center of said protractor substantially coinciding with the vertex of said mirror.

4. A drawing instrument comprising a ruler provided with a scale extending along an edge thereof and having a zero point, bracket means slidably receiving said ruler, a mirror secured to said bracket means, said mirror having a bottom portion formed with a vertex, said bracket means being constructed and arranged to support said mirror with said vertex located substantially in a position coplanar with and rising vertically from said bottom edge, and means detachably securing said ruler in said bracket means with said vertex substantially coinciding with said zero point.

5. A drawing instrument comprising a straight-edged ruler provided with scale markings along an edge thereof and with a zero mark at the intermediate portion thereof, said scale markings increasing in numerical value on opposite sides of said zero mark, a mirror secured to said ruler, said mirror having a bottom portion formed with a vertex, said mirror rising vertically from said edge in a plane containing said edge and with said vertex located substantially at said zero mark, and a substantially semicircular protractor secured to said ruler and contained in the bottom plane of the ruler, the center of said protractor substantially coinciding with said vertex.

6. A drawing instrument comprising a straight-edged ruler of substantially triangular cross section, each surface of the ruler being provided with a scale extending along its edge and having a zero point substantially at the transverse median plane of the ruler, the scales having numerical markings increasing in value on opposite sides of the zero points thereof, bracket means slidably receiving said ruler, a mirror secured to said bracket means, said mirror having a bottom portion formed with a vertex, said bracket means being constructed and arranged to support said mirror with said vertex located substantially at a bottom edge of said scale and in a position coplanar with and rising vertically from said bottom edge, and means detachably securing said ruler in said bracket means with said vertex substantially coinciding with a zero point of the scale associated with said bottom edge.

7. A drawing instrument comprising a straight-edged ruler provided with a scale extending along its edge and having a zero point substantially at the transverse median plane thereof, the scale having numerical markings increasing in value on opposite sides of the zero point, bracket means slidably receiving said ruler, a mirror secured to said bracket means, said mirror having a bottom portion formed with a vertex, said bracket means being constructed and arranged to support said mirror with said vertex located substantially in a position coplanar with and rising vertically from the bottom edge of the ruler, means detachably securing said ruler in said bracket means with said vertex substantially coinciding with the zero point of the scale, and a substantially semi-circular protractor secured to said ruler and contained in the bottom plane thereof, the center of the protractor substantially coinciding with said vertex.

References Cited in the file of this patent

UNITED STATES PATENTS

| | | |
|---|---|---|
| 735,899 | Paul | Aug. 11, 1903 |
| 781,117 | Willits | Jan. 31, 1905 |
| 2,445,792 | Lunney | July 27, 1948 |